Patented Aug. 27, 1940

2,212,816

UNITED STATES PATENT OFFICE 2,212,816

COPPER COMPLEX COMPOUND OF POLYAZO DYESTUFFS

Carl Theo Schultis and Hans Schindhelm, Bergen, near Frankfort-on-the-Main, Germany, assignors to General Aniline & Film Corporation, New York, N. Y., a corporation of Delaware No Drawing. Application November 1, 1939, Serial No. 302,364. In Germany November 14, 1938

4 Claims. (Cl. 260—146)

Our present invention relates to new copper complex compounds of polyazo dyestuffs more particularly to those of the general formula:

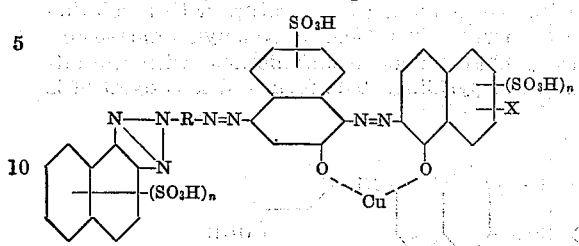

wherein the $n$'s stand for the number 1 or 2, R stands for a member of the group consisting of radicles of the benzene, naphthalene and diphenyl series, X for a member of the group consisting of OH, NH-acyl and NH-aryl.

The aforesaid new copper complex compounds are obtained according to the present invention for instance by the following process of manufacture: Nitroamino compounds or monoacyldiamino compounds respectively of the benzene, naphthalene and diphenyl series are diazotized and the diazo compounds obtained are combined with an amine of the naphthalene series coupling in o-position to the amino group. The o-aminoazo dyestuffs formed are converted into the corresponding triazole derivatives by reacting the amino group with the azo group. Then the nitro group of the first component is reduced to the amino group or the acylamino group respectively is saponified, the amino compound formed is diazotized and the diazo compound obtained is combined with a diazotizable amine of the naphthalene series containing in o-position to the diazotizable amino group a group capable of being metallized. The amino-monoazo dyestuffs thus obtained are further diazotized and the diazo compound formed is combined with a compound of the naphthalene series containing in o-position to the coupling position a group capable of being metallized. The disazo dyestuffs thus obtained are then converted into their copper complex compounds.

The single stages of the aforesaid process may also be performed in another sequence. Thus for example the formation of the triazole ring and the formation of the copper complex groups can be accomplished by single simultaneous reaction.

Further on the synthesis of the polyazo dyestuffs may be performed in the following sequence: The diazo compound of the nitroamino- or acyldiamino compound respectively is combined with the middle component according to the aforesaid formula, i.e. a diazotizable amine of the naphthalene series containing in o-position to the amino group a group capable of being metallized. The aminoazo dyestuff formed is diazotized and the diazo compound obtained is combined with the end component according to the aforesaid formula, i. e. a compound of the naphthalene series containing in o-position to the coupling position a group capable of being metallized. Then the nitro group in the first component is reduced or the acylamino compound is saponified respectively, the formed aminodisazo dyestuff is diazotized and the diazo compound obtained is combined with an amine of the naphthalene series coupling in o-position to the amino group. Hereupon the formation of the triazole ring and of the copper complex groups is simultaneously performed.

The new copper complex compounds prepared according to the present invention are valuable dyestuffs for the dyeing of vegetable fibers, and the dyeings obtained are distinguished by good fastness properties, especially by an excellent fastness to light.

In order to further illustrate our invention the following examples are given, the parts being by weight.

Example 1

21.4 parts of 4-nitro-4'-aminodiphenyl are diazotized in the usual manner and the diazo compound formed is combined with an aqueous solution of 31 parts of 2-aminonaphthalene-3.6-disulfonic acid in the presence of sodium carbonate. When the combination is complete, the dyestuff formed is filtered off and dissolved in about 1500 parts of boiling water. Then 40 parts of concentrated ammonia and the aqueous solution of 52 parts of crystallized copper sulfate are added, whereby the formation of the triazole compound occurs. The triazole compound formed is filtered off and converted into the corresponding amino compound by reducing the nitro group by means of iron and acetic acid in the usual manner.

49.6 parts of the amino-triazole thus obtained are diazotized and combined with an aqueous solution of 27 parts of 1-amino-2-ethoxy-naphthalene-6-sulfonic acid in the presence of sodium carbonate. The amino-azo dyestuff formed is freed from the excess of 1-amino-2-ethoxynaphthalene-6-sulfonic acid by dissolving it in water and reprecipitating it from this solution. Then it is further diazotized and combined with an aqueous solution of 36 parts of the sodium salt of 2.3'-carboxyphenylamino - 5 - hydroxynaphthalene-7-sulfonic acid in the presence of pyridine. The disazo dyestuff formed is isolated, dissolved in water and reprecipitated from this solution. Hereupon the paste of the disazo dyestuff is dissolved in water, a little amount of acetic acid and the concentrated aqueous solutions of 82 parts of sodium acetate and of 30 parts of copper sulfate are added and the mixture is heated to boiling for about 7 hours. The copper complex compound of the dyestuff formed of the formula:

is purified by dissolving it in water containing sodium carbonate and reprecipitating it from this solution. It is, when dry, a dark powder, soluble in concentrated sulfuric acid with a bluish green color and in water with a green color, dyeing cotton green shades of very good fastness to light.

The formation of the aminotriazole compound may be likewise carried out by coupling the 2-aminonaphthalene-3.6-disulfonic acid with the diazo compound of 4-acetylamino-4'-aminodiphenyl, oxidizing the monoazo dyestuff thus formed to the triazol compound and forming the aminotriazol compound by saponifying the acetylamino group.

When using as final component the 1.8-dihydroxynaphthalene-3.6-disulfonic acid or the 1-acetylamino - 8 - hydroxynaphthalene-4- sulfonic acid respectively dyestuffs are obtained which dye green and gray-olive shades respectively of a good fastness to light. The first of these dyestuffs corresponds with the formula:

Example 2

The diazo compound of 26.8 parts of 1-amino-4-nitronaphthalene-7-sulfonic acid is combined in the presence of sodium carbonate with 23 parts of 1-amino-naphthalene-4-sulfonic acid. The monoazo dyestuff formed is isolated, oxidised to the triazol compound and by reducing the nitro group the aminotriazol compound is formed as described in Example 1. Then the diazo compound of 47 parts of the formed aminotriazole is combined in the presence of sodium carbonate with 27 parts of 1-amino-2-ethoxynaphthalene-6-sulfonic acid. The diazo compound of this intermediate is then combined at boiling temperature with a solution of 36 parts of 2-(3'-carboxyphenylamino)-5-hydroxy-naphthalene-7-sulfonic acid with the addition of pyridine. The formed disazo dyestuff is isolated and its aqueous solution is heated to boiling for about 7 hours after the addition of an excess of sodium acetate and 30 parts of copper sulfate. The formed copper complex compound of the formula:

is when dry a dark powder soluble in water with a greenish blue color and in concentrated sulfuric acid with a gray-green color. It dyes cotton greenish gray shades of an excellent fastness to light.

Example 3

The diazo compound of 13.8 parts of 1-amino-4-nitrobenzene is combined in the presence of sodium carbonate with 23 parts of 2-aminonaphthalene-7-sulfonic acid. The isolated dyestuff is converted according to Example 1 into the aminotriazol compound. The diazo compound of 34 parts thereof is combined with 27 parts of 1- amino-2-ethoxy-naphthalene-6-sulfonic acid, the formed intermediate is diazotized and again com-

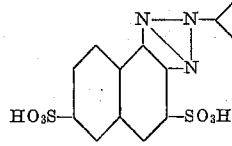

bined with 36 parts of 2-(3'-carboxyphenylamino)-5-hydroxynaphthalene-7-sulfonic acid in the presence of pyridine and then the copper complex compound is formed as described in Example 1. It corresponds with the formula:

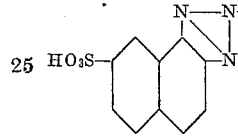

and is when dry a dark powder soluble in water with a green color and in concentrated sulfuric acid with a greenish gray color and dyes cotton bluish green shades of an excellent fastness to light.

We claim:

1. Copper complex compounds of polyazo dyestuffs of the general formula

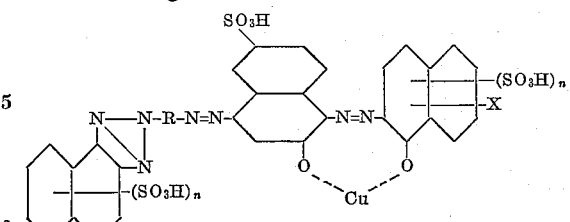

wherein the $n$'s stand for the number 1 or 2, R stands for a member of the group consisting of radicles of the benzene, naphthalene and diphenyl series, X for a member of the group consisting of OH, NH-acyl and NH-aryl.

2. The copper complex compound of the formula:

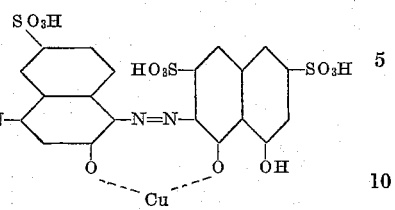

which is a dark powder, soluble in concentrated sulfuric acid with a bluish green color and in water with a green color, dyeing cotton green shades of very good fastness to light.

3. The copper complex compound of the formula:

which is a dark powder, soluble in concentrated sulfuric acid with a gray green color and in water with a greenish blue color, dyeing cotton greenish gray shades of good fastness to light.

4. The copper complex compound of the formula:

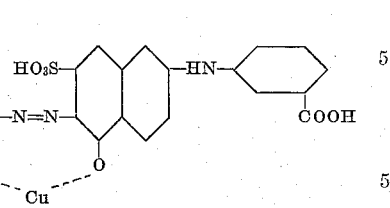

which is a dark powder, soluble in concentrated sulfuric acid with a greenish-gray color and in water with a green color, dyeing cotton clear bluish-green shades of very good fastness to light.

CARL THEO SCHULTIS.
HANS SCHINDHELM.